United States Patent [19]

Li

[11] Patent Number: 6,136,469

[45] Date of Patent: *Oct. 24, 2000

[54] MULTI-POLYACID ELECTROLYTES FOR ELECTROCHEMICAL CELLS AND CELLS USING SAME

[75] Inventor: Changming Li, Vernon Hills, Ill.

[73] Assignee: Motorola, Inc., Schaumburg, Ill.

[ * ] Notice: This patent is subject to a terminal disclaimer.

[21] Appl. No.: 09/027,497

[22] Filed: Feb. 20, 1998

[51] Int. Cl.[7] .................................................. H01M 6/04
[52] U.S. Cl. ..................... 429/189; 429/188; 429/344; 252/62.2; 361/525; 361/528; 361/532
[58] Field of Search ..................... 361/525, 528, 361/532; 429/29, 30, 33, 34, 36, 40, 42, 46, 188, 190, 189, 191, 192, 193, 194, 195, 203, 204, 206, 207, 209, 212, 213; 252/62.2

[56] References Cited

U.S. PATENT DOCUMENTS

| | | | |
|---|---|---|---|
| 4,594,297 | 6/1986 | Polak et al. | 429/13 |
| 5,382,481 | 1/1995 | Fleischer | 429/213 |
| 5,512,391 | 4/1996 | Fleischer | 429/213 |
| 5,580,681 | 12/1996 | Fleischer | 429/192 |
| 5,847,920 | 12/1998 | Li et al. | 361/525 |

*Primary Examiner*—Bruce F. Bell
*Attorney, Agent, or Firm*—Felipe J. Farley; Philip Burrus

[57] ABSTRACT

An electrolyte for an electrochemical cell is described comprising two or more polyanion-based compounds of the general formula:

$$M_m[X_xY_yO_z] \cdot nH_2O$$

where

M is selected from the group consisting of ammonia and the elements of Groups IA and IIA of the Periodic Table;

X and Y are different and are selected from the group consisting of the elements of Groups IIIB, IVB, VB, and VIB of the Periodic Table, and boron, aluminum, gallium, silicon, germanium, tin, phosphorous, arsenic, antimony, bismuth, selenium, tellurium, polonium, indium, and astatine;

O is oxygen; and m is an integer from 1 to 10, inclusive;

x is an integer from 0 to 1, inclusive;

y is an integer from 2 to 13, inclusive;

z is an integer from 7 to 80, inclusive; and n is an integer from 2 to 100, inclusive.

8 Claims, 1 Drawing Sheet

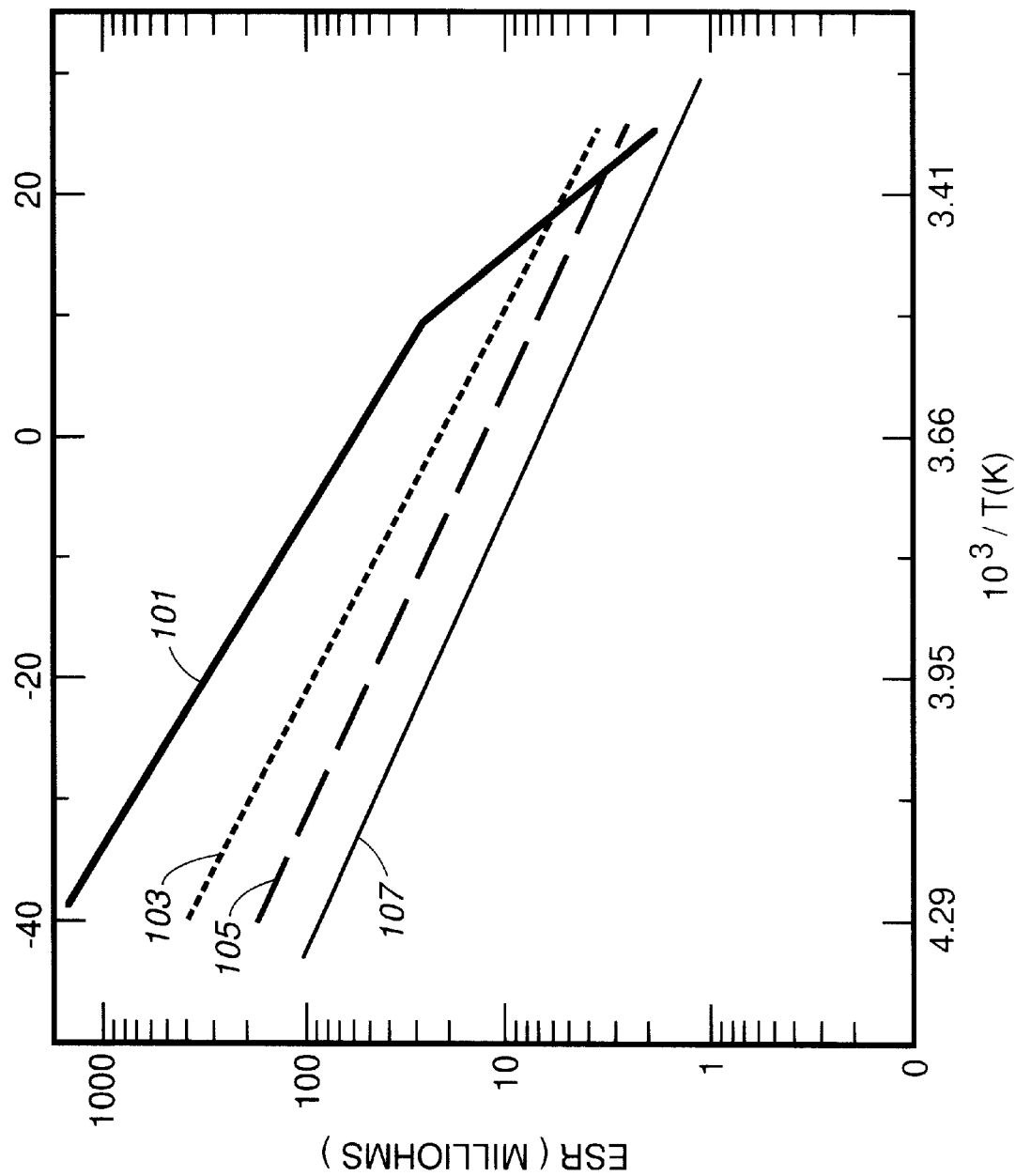

ABSTRACT
MULTI-POLYACID ELECTROLYTES FOR ELECTROCHEMICAL CELLS AND CELLS USING SAME

TECHNICAL FIELD

This invention relates in general to electrochemical energy storage systems, and more particularly to electrolytes for such energy storage systems.

BACKGROUND OF THE INVENTION

There has been a great deal of interest in developing better and more efficient methods for storing energy for applications such as radio communications, satellites, portable computers, and cellular telephones. There have also been recent efforts to develop high energy, cost-effective batteries and electrochemical capacitors having improved performance.

Rechargeable or secondary cells are often more desirable than primary, non-rechargeable cells, since the electrodes of secondary cells can be regenerated many times by the application of an electrical current. Numerous advanced electrode systems have been developed for storing electrical charge. Concurrently, great effort has been dedicated to the development of electrolytes capable of enhancing the capacity of electrochemical cells.

Accordingly, there is a need to provide improved electrolytes for electrochemical energy storage systems.

BRIEF DESCRIPTION OF THE DRAWINGS

FIG. 1 is a graph showing the temperature in thousands of degrees Kelvin, in the abscissa, plotted against the logarithm of the equivalent series resistance, in milliohms, for cells with different electrolyte formulations.

DETAILED DESCRIPTION OF THE PREFERRED EMBODIMENT

The present invention is an electrolyte for an electrochemical cell, where the electrolyte comprises two or more polyanion-based compounds of he following general formula:

$$M_m[X_xY_yO_z] \cdot nH_2O \tag{1}$$

where:

M is selected from the group consisting of ammonium and the lements of Groups 1A and 2A of the Periodic Table;

X and Y are different, and are selected from the group consisting of the elements of groups 3B, 4B, 5B and 6B of the Periodic Table, and boron, aluminum, gallium, silicon, germanium, tin, phosphorous, arsenic, antimony, bismuth, selenium, tellurium, polonium, indium, and astatine, O is oxygen; and m is an integer from 1 to 20, inclusive;

x is an integer from 0 to 1, inclusive;

y is an integer from 2 to 13, inclusive;

z is an integer from 7 to 80, inclusive; and n is an integer from 2 to 100, inclusive.

The polyanion-based compound is a polyacid when M is hydrogen; it is a polysalt when M is a metal ion. When x is 0, the compound is an isopolyacid or an isopolysalt. When x is 0, y is an integer from 2 to 13, z is an integer from 7 to 80, and n is an integer from 2 to 100. When x is 1, the polyanion-based compound is a heteropolyacid or heteropolysalt. In this case, y is an integer from 6 to 12; z is an integer from 30 to 80; and n is an integer from 3 to 100.

The conductivity of a solid electrolyte depends on its ionic mobility. The ionic mobility is directly related to the crystal structure, and in particular to the openness of the conduction pathways. Most ionic solids have densely packed crystal structures with narrow bottlenecks, and without obvious well-defined conduction pathways. Consequently, their conductivity is low. Therefore, if a solid electrolyte had a better conduction pathway, it would have better conductivity.

When crystals are grown from a mixture containing different isopolyacids and heteropolyacids, in solution, defects in the crystal structure, such as dislocation and vacancy can form. Some elements, in particularly, the transition metal elements in isopolyacids and heteropolyacids have additional coordination capacity. These can dynamically disrupt the crystal lattice to form more defects. These defects may well result in better ion conduction pathways. The present invention is an electrolyte formed from mixtures of polyanion-based compounds.

In one embodiment of the invention, the electrolyte is formed from a mixture of polytungstophosphoric acid (PTA), polyphosmolybdic acid (PMA), and polysilicotungstic acid (PSA). In another embodiment of the invention, the electrolyte comprises a multipolyacid film formed by coating onto a first and second electrode contacting the electrolyte, the solution of 45.8%/wt PSA, 25.8% wt PTA, 8.4% wt PMA, and 3.0wt % polyvinyl alcohol, and then drying the solution onto the electrodes. In another embodiment of the invention, the electrolyte is used in an electrochemical capacitor. The capacitor includes a mixture of two or more polyanion-based compounds as the electrolyte, where the electrode active material is a metal oxide and the metallic substrates are titanium substrates. In another embodiment of the invention, the metal oxide is ruthenium dioxide, dispersed in a polymer-conductive mixture layer. In another embodiment of the invention, the current collector contacting the electrolyte is aluminum.

Certain of the polyanion-based compounds of the present invention can be used as corrosion inhibitors to improve the corrosion resistance of an electrochemical cell. These compounds include, but are not limited to, molybdic isopolyacids and heteropolyacids, such as polyphosphomolybdic acid. Electrochemical cells using the electrolyte described herein have high energy conductivity, high capacity, high energy density, and can have high corrosion resistance.

The invention will be better understood with reference to the following non-limiting examples.

EXAMPLE I

Electrolyte Preparation

Polytungstophosphoric acid (PTA), polyphosphomolybdic acids, (PMA) and silicotungstic acids (PSA) from Aldrich Chemical Company (St. Louis, Mo.) were used to prepare an electrolyte precursor solution. The precursor solution contained a small amount of poly(vinyl-alcohol) (PVA) for adhesion during coating. First, a 7% (by weight) PVA aqueous solution was prepared by dissolving PVA in deionized water. Then PSA, PTA, and PMA were one by one sequentially dissolved in the PVA solution. A later acid was not added to the solution until the former one had dissolved and an uniform solution had formed. The final precursor solution contained 25.8% (by weight) PSA, 25.8% (by weight) PTA, 8.4% (by weight) PMA,. and 3.0% PVA.

200 μl of the electrolyte precursor solution was coated on the electrode surface by paint-brushing, and fully dried in a humid air environment at a humidity of about 50%. Then two more coatings of the electrolyte were applied on the top of the first dry coating with the same method described above. A later coating was not applied until the former coating was fully dried.

Single cells were made by laminating two electrolyte-coated electrodes together under 10 psi pressure. The cells were heat-treated at 85 degrees C. in an atmospheric oven for 15 minutes.

After heat treatment, a thin layer of the solid polymultiacid electrolyte formed. The thickness and weight of the electrodes, before coating electrolyte, were measured. After heat-treatment, the thickness and weight of the cell were measured again. The density of the multipolyacid electrolyte can be calculated by dividing the net weight of the electrolyte (subtracting the weight of electrodes before coating electrolyte) by the volume of the electrolyte (cell surface× (cell thickness−2×electrode thickness)). The multiheteropolyacid solid electrolyte had only two-thirds of the density of the PTA solid electrolyte. This electrolyte can therefore provide higher energy density than a monopolyacid electrolyte.

EXAMPLE II
Performance in Direct Bond Electrode-based Cells

Electrodes were made by thermally formed $RuO_2/TiO_2$ on a thin titanium foil substrate. Since the $RuO_2/TiO_2$ coating on the Ti forms a solid oxide solution that is chemically directly bonded on the Ti substrate, we call this type of electrode "direct bond" electrodes (DB). The method to make DB electrodes in detail has been disclosed in the patent application EN 10326, U.S. Ser. No. 08/586,619 filed Mar. 19, 1997 and assigned to Motorola, Inc., incorporated herein by reference. Single cells were made with DB electrodes and the multi-polyacid electrolyte precursor solution in accordance with the method described in Example I. For comparison, single cells were made from individual PTA, PMA, and PSA precursor solutions containing 2.8% PVA, and 60% PTA, PMA and PSA respectively, that is equal to the total amount of PTA+PSA+PMA in the multi-polyacid electrolyte. The cell equivalent resistance (ESR) was measured by an HEWLETT PACKARD (HP) milliohmmeter. The cell capacitance were measured by cyclovoltammetry (CV) experiments at 100 mV/s. The results are shown in Table I. A surface area for all electrodes is 20 cm² and the electrolyte thickness is about 2 mils. The electrolyte resistance is obtained by subtracting the current collector (titanium foil substrate) resistance from cell ESRs. The results demonstrate that the multi-polyacid electrolyte has lower ESR than its component polyacid alone. Additionally, the multi-polyacid electrode produces the highest cell capacitance.

TABLE I

| Electrolyte | ESR (m) | C (mF) | IL ($\mu A/cm^2$) |
|---|---|---|---|
| PTA | 3.3 | 61 | 1.1 |
| PTA | 2.2 | 102 | 1.0 |
| PSA | 1.8 | 74 | 2.1 |
| PMA/PTA/PSA | 1.5 | 105 | 2.2 |

Single cells with the multi-heteropolyacid electrolyte and mono-heteropolyacid electrolytes (PTA, PMA, and PSA) were tested under different temperatures in an environmental chamber (Russells Technical Products, Holland, Mich.) with the humidity function off. The ESR changes versus temperature were measured by the HP milliohmmeter. In general, the conductivity of an solid electrolyte decreased with a decrease in temperature. Theoretically, temperature dependence of the electrolyte conductivity is related to the activation energy ($E_a$). In solid electrolytes, this represents the ease of ion hopping. The Arrhenius expression for the solid electrolyte conductivity is given by the equation:

$$\text{sigma} = A\exp(-E_a/RT) \quad (2)$$

since sigma=$t/R_{esr}S$) where t is the electrolyte thickness and S is the electrode surface area and R is the resistance, Equation 2 can be expressed as:

$$\log R_{esr} = A° + E_a/(2.303RT) \quad (3)$$

A plot of log $R_{esr}$ vs $T^{-1}$ should be a straight line. FIG. 1 shows a plot of log $R_{esr}$ versus $T^{-1}$ for various electrolytes. The plots for PTA, PMA, and multi-heteropolyacid electrolytes are single straight lines. The plot for the PSA electrolyte has two straight lines in different temperature regions, the temperature according to the cross points is ~10° C. This indicates that the phase transition of the PSA occurs at 10° C. The $E_a$ can be obtained from the slopes of the plot. $E_a$s for PTA, PSA (low temperature range), PMA, and PTA–PSA–PMA multipolyacid electrolyte are 0.30, 0.33, 0.29, and 0.28 respectively. The smaller the $E_a$, the less the temperature dependence of the conductivity. FIG. 1 shows that the multi-heteropolyacid electrolyte not only improves the conductivity, but also lessens the temperature dependence. The multi-polyacid electrolytes (PTA–PSA–PMA) also has excellent high temperature performance.

EXAMPLE 3
Performance in PB (Polymer Bond) Electrode-based Cells

It has been disclosed in a patent application (EN 10306, U.S. Ser. No. 08/743,610 filed Nov. 4, 1996, and assigned to Motorola, Inc. incorporated herein by reference) that an electrode structure consisting of active material embedded in an electronically conductive adhesive layer, which provides electrical connection to the current collector. We call these electrodes "polymer bond" electrodes (PB). The PB electrodes used in this example were made by loading powder $RuO_2$ in a cured conductive polymer ink layer on Al foils. These electrodes are porous and may have high ESRs for the cells. Polymer bond electrodes with a surface areas of 17 cm² were used to make single cells with different polyacid electrodes. The cell ESRs were measured by the HP milliohmmeter. The cell capacitances were measured by CV experiments at 100 mV/s. The results are shown in Table 2. Since the electrode substrates are Al foils and have low resistance, the cell ESRs do not require subtracting the substrate (current collector) resistance. The results demonstrate that the multi-heteropolyacid electrolyte can significantly reduce the PB cell ESR and increase the cell capacitance, while keeping low leakage current.

TABLE II

| Electrolyte | ESR (m) | C (mF) | $I_L$ ($\mu A/cm^2$) |
|---|---|---|---|
| PMA/PTA/PSA | 12 ± 2 | 1600 | 6 |
| PSA | 17 ± 2 | 1560 | 7 |
| PTA | 20 ± 2 | ~1250 | 6 |

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

I claim:

1. An electrolyte for an electrochemical cell comprising two or more polyanion-based compounds with the following general formula:

$$M_m[X_xY_yO_z]\cdot nH_2O$$

where

M is selected from the group consisting of ammonia and the elements of Groups IA and IIA of the Periodic Table;

X and Y are different and are selected from the group consisting of the elements of Groups IIIB, IVB, VB, and VIB of the Periodic Table, and boron, aluminum, gallium, silicon, germanium, tin, phosphorous, arsenic, antimony, bismuth, selenium, tellurium, polonium, indium, and astatine;

O is oxygen; and m is an integer from 1 to 10, inclusive;

x is an integer from 0 to 1, inclusive;

y is an integer from 2 to 13, inclusive;

z is an integer from 7 to 80, inclusive; and n is an integer from 2 to 100, inclusive.

2. The electrolyte of claim 1 wherein M is hydrogen.

3. The electrolyte of claim 1 wherein M is a metal ion.

4. The electrolyte of claim 1 wherein:

x=1;

y is an integer between 6 an 12, inclusive; and z is an integer between 30 and 80 inclusive; and n is an integer between 3 and 100 inclusive.

5. The electrolyte of claim 1, wherein:

x=0;

y is an integer between 2 to 13, inclusive;

z is an integer between 7 to 80, inclusive; and n is an integer from 2 to 100, inclusive.

6. The electrochemical cell comprising the electrolyte of claim 1.

7. The electrochemical cell of claim 6, wherein the electrochemical cell is a battery.

8. The electrochemical cell of claim 6, wherein the electrochemical cell is a capacitor.

* * * * *